(12) United States Patent
Matthews

(10) Patent No.: US 9,305,358 B2
(45) Date of Patent: Apr. 5, 2016

(54) MEDICAL IMAGE PROCESSING

(71) Applicants: Kabushiki Kaisha Toshiba, Minato-ku (JP); Toshiba Medical Systems Corporation, Otawara-shi (JP)

(72) Inventor: James Matthews, Edinburgh (GB)

(73) Assignees: KABUSHIKI KAISHA TOSHIBA, Minato-ku (JP); TOSHIBA MEDICAL SYSTEMS CORPORATION, Otawara-shi (JP)

( * ) Notice: Subject to any disclaimer, the term of this patent is extended or adjusted under 35 U.S.C. 154(b) by 325 days.

(21) Appl. No.: 13/932,311

(22) Filed: Jul. 1, 2013

(65) Prior Publication Data

US 2015/0003696 A1    Jan. 1, 2015

(51) Int. Cl.
*G06T 7/00* (2006.01)

(52) U.S. Cl.
CPC ............. *G06T 7/0081* (2013.01); *G06T 7/003* (2013.01); *G06T 2207/10072* (2013.01); *G06T 2207/20128* (2013.01); *G06T 2207/30004* (2013.01)

(58) Field of Classification Search
CPC ... G06T 7/0012; G06T 7/0014; G06T 7/0024; G06T 7/003; G06T 7/0034; G06T 7/0081; G06T 2207/20128; G06T 2207/30004
See application file for complete search history.

(56) References Cited

U.S. PATENT DOCUMENTS 8,160,357 B2    4/2012    Akinyemi et al. ............ 382/173

OTHER PUBLICATIONS

Mei Chen et al. "3-D Deformable Registration of Medical Images Using a Statistical Atlas", Technical Report, CMU-RI-TR-98-35, Robotics Institute, Carnegie Mellon University, Dec. 1998, 9 pages.
Mei Chen et al. "3-D Deformable Registration of Medical Images Using a Statistical Atlas", Robotics Institute, Carnegie Mellon University 10 pages.
William R. Crum et al. "Information Theoretic Similarity Measures in Non-Rigid Registration", Information Processing in Medical Imaging, Lecture Notes in Computer Science, vol. 2732, 2003, 11 pages.

*Primary Examiner* — Andrew W Johns
(74) *Attorney, Agent, or Firm* — Oblon, McClelland, Maier & Neustadt, L.L.P.

(57) ABSTRACT

Certain embodiments provide a computer system for determining a registration mapping between a novel medical image and a reference medical image, the computer system comprising: a storage system adapted to store data representing the novel medical image and the reference medical image and variance data for a plurality of different locations in the reference medical image representing a statistical variation for corresponding locations identified in a plurality of training medical images; and a processor unit operable to execute machine readable instructions to determine a registration mapping between the novel medical image and the reference medical image in a manner that takes account of the variance data for the plurality of different locations in the reference medical image.

10 Claims, 10 Drawing Sheets

MEDICAL IMAGE PROCESSING

BACKGROUND OF THE INVENTION

Embodiments described herein generally relate to medical image processing, and in particular to registering a medical image dataset with a reference medical image dataset.

In the medical field, two-dimensional (2D) and three-dimensional (3D) image datasets are collected by a variety of techniques—referred to as modalities in the field—including conventional X-ray, computer-assisted tomography (CT), magnetic resonance (MR), ultrasound and positron-emission-tomography (PET). Examples of 2D images include not only conventional X-ray images, but also 2D images derived from 3D image datasets, i.e. volume datasets, such as a "slice" of a CT scan or a "slab" of volume data from a CT scan in a multi-planar reformatting (MPR) view. Time resolved 3D studies are also well known and are usually referred to as 4D studies, with time being the fourth "dimension". For example, time-resolved perfusion in abdominal organs is measured using 4D dynamic contrast enhanced CT (DCE-CT). It is also known to co-present images of the same patient taken with different modalities, such as combining CT and PET scans into a single image. These combined representations are sometimes referred to as 5D studies.

A common task when processing/reviewing medical image data is a desire to identify pixels/voxels in an image dataset that correspond with a particular feature of interest, for example a specific anatomical feature (object) under investigation. The method by which features of interest represented in image data are identified is referred to as segmentation. When medical image data has been segmented to identify feature(s) of interest, information regarding the parts of the data (e.g. in terms of specific pixels/voxels) corresponding with the feature(s) of interest may be referred to as segmentation data/information and may be recorded for later use.

Manual segmentation of image data may be performed by an expert viewing a representation of the data on a display and manually identifying objects of interest, for example by marking locations associated with an object of interest on the display through a user input device, such as a mouse or trackball.

Manual segmentation can typically provide highly reliable segmentation results in view of the sophistication of the expert in recognizing objects, such as a clinician identifying organs and their sub-structure in 2D or 3D X-ray images. However, a drawback of manual segmentation is that it can be a very labor-intensive process, and this can make it impractical where large numbers of datasets are being processed, for example as part of a large-scale comparative study. Another potential drawback of manual segmentation is the inherent subjectivity of the clinician and the need for trained individuals to perform the task reliably.

To help address these drawbacks, automated image processing procedures carried out by computers have been developed to automatically perform segmentation in a host of different applications.

FIG. 1 is a flow chart schematically showing the principles of a general approach to automatic segmentation.

In step R1, a novel image dataset (e.g. a patient image dataset under investigation) is provided to a computer for segmentation.

In step R2, a registration is carried out to align the novel image dataset with a reference image dataset which has already been segmented and stored along with its segmentation data. This alignment step is referred to in the prior art as registration. The output of registration is a spatial mapping between the voxels of the reference image dataset and the novel image dataset. The reference image dataset with its segmentation data is referred to as an atlas dataset, or simply an atlas. The atlas typically carries the segmentation data in a set of masks which indicate labeled features, such as one or more anatomical features that have been labeled manually. For example, in the case of a 3D medical image, the atlas has its anatomical regions of interest labeled, so that all voxels belonging to a particular anatomical region are marked with a common label.

In step R3, the spatial mapping computed in step R2 is applied to the atlas segmentation data, in such a way as to propagate the atlas segmentation data from the reference image dataset to the novel image dataset.

In step R4, the segmented novel image dataset, i.e. the novel image dataset and the associated segmentation data/information, is output. In the case of 3D medical image data, the novel image dataset may be loaded into and displayed by a volume rendering program, which may exploit the segmentation data to allow selective configuration of display parameters based on the segmentation data.

A key aspect to the performance of the of the approach of FIG. 1 is the extent to which the novel image dataset can be properly registered with the atlas dataset. There are various approaches to the registration process which are designed to optimize the overlap in features represented in the novel and atlas datasets following registration. Nonetheless, the wide variations in physiology between patients means it can be difficult to select an atlas dataset and registration process that can work equally well for all patients.

The process of registering a novel dataset with an atlas dataset will typically involve various transformations, such as rigid, non-rigid and warp transformations. One approach to dealing with the wide variations in patient physiology is to allow significant degrees of freedom in how the transformation to be used during the registration process may be applied. However, allowing too much freedom in the registration transformations can give rise to unrealistic results, for example by in effect allowing for the data to be over-fitted, and for tearing and other discontinuities to arise in the registered dataset.

An alternative approach to dealing with the potential for wide variations in patient physiology is to rely on multiple atlases. With a multi-atlas segmentation approach an appropriate atlas for a given novel dataset may be selected from among a plurality of atlases, for example based on the registration performance observed for different atlases (e.g. in effect selecting whichever atlas best matches the novel dataset). However, automated medical image data processing is a highly computer-intensive process, primarily because of the large amounts of data typically involved, and multi-atlas approaches to segmentation can significantly increase the amount of processing and memory required to process the image data. Furthermore, in some situations there may be a desire to map features of a number of novel study datasets to a "standard" atlas dataset, for example to allow for consistent comparison between a number of novel datasets. However, relying on different atlases for different novel datasets impacts the extent to which this can be reliably done.

In view of these drawbacks with existing approaches there is a need to provide improved schemes for medical image processing, and in particular to provide improved schemes for registering a medical image dataset with a reference medical image dataset.

BRIEF DESCRIPTION OF THE DRAWINGS

Embodiments of the invention are now described by way of example only with reference to the following drawings.

DETAILED DESCRIPTION

Figure 1:
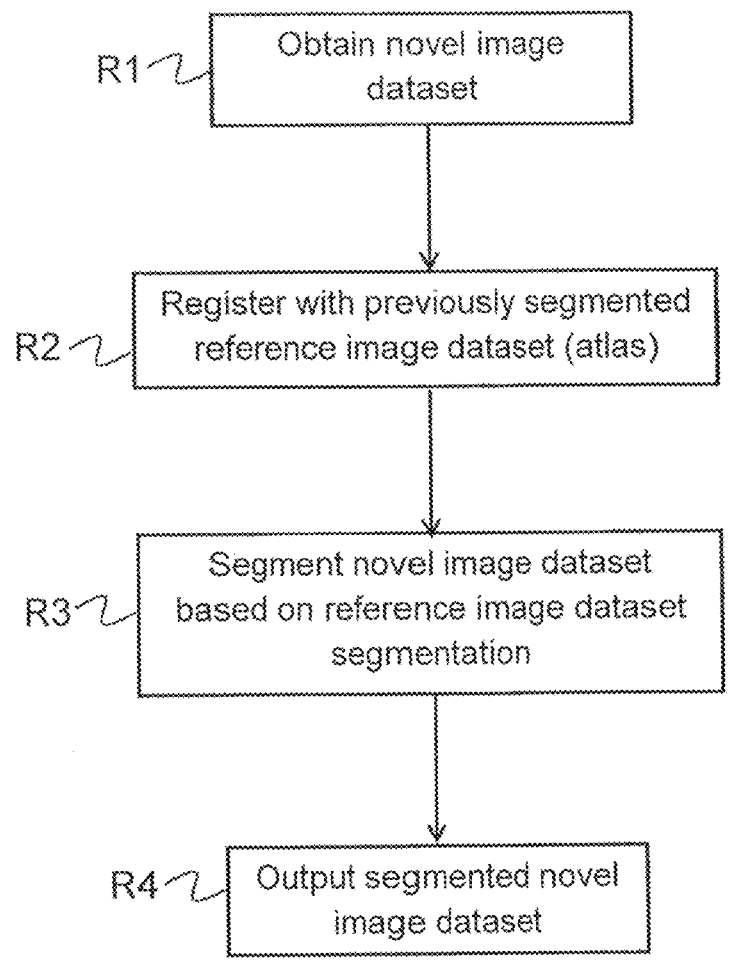
FIG. 1 is a flow chart schematically showing the principles of an approach to automatic segmentation.

Certain embodiments of the invention provide a computer system operable to determine a registration mapping between a novel medical image and a reference medical image, the computer system comprising: a storage system adapted to store data representing the novel medical image and the reference medical image and variance data for a plurality of different locations in the reference medical image representing a statistical variation for corresponding locations identified in a plurality of training medical images; and a processor unit operable to execute machine readable instructions to: determine a registration mapping between the novel medical image and the reference medical image in a manner that takes account of the variance data for the plurality of different locations in the reference medical image.

In accordance with certain embodiments the registration mapping is subject to a regularization constraint determined from the variance data for the plurality of different locations in the reference medical image.

In accordance with certain embodiments the regularization constraint is applied to restrict an amount of distortion associated with the registration mapping for the plurality of different locations in the reference medical image In accordance with certain embodiments the regularization constraint is applied to restrict differences in the amount of distortion associated with the registration mapping for the plurality of different locations in the reference medical image.

In accordance with certain embodiments the regularization constraint comprises an elastic fluid constraint.

In accordance with certain embodiments the regularization constraint comprises a viscous fluid constraint.

In accordance with certain embodiments the variance data comprises a volume dataset and the plurality of different locations for the variance data in the reference medical image correspond with voxel locations in the reference medical image.

In accordance with certain embodiments the reference medical image is based on a combination of the training medical images.

In accordance with certain embodiments the storage system is further adapted to store segmentation information for the reference medical image, and the processor is further operable to generate segmentation information for the novel medical image based on the segmentation information for the reference medical image by taking account of the determined registration mapping.

In accordance with certain embodiments the storage system is further adapted to store landmark information for the reference medical image, and the processor is further operable to generate landmark information for the novel medical image based on the landmark information for the reference medical image by taking account of the determined registration mapping.

Certain embodiments of the invention provide a computer-implemented method for determining a registration mapping between a novel medical image and a reference medical image, the method comprising: obtaining a novel medical image, a reference medical image and variance data for a plurality of different locations in the reference medical image representing a statistical variation among corresponding locations identified in a plurality of training medical images; and determining a registration mapping between the novel medical image and the reference medical image by taking account of the variance data for the plurality of different locations in the reference medical image.

Certain embodiments of the invention provide a computer system operable to determine variance data for a plurality of different locations in a reference medical image, the variance data representing a statistical variation among corresponding locations identified in a plurality of training medical images, the computer system comprising: a storage system adapted to store data representing the reference medical image and the plurality of training medical images; and a processor unit operable to execute machine readable instructions to: receive an indication of locations of a plurality of anatomical features in the reference medical image and an indication of locations of corresponding anatomical features in respective ones of the training medical images; determine offsets between respective ones of the locations of the anatomical features in the reference medical image and locations for the corresponding anatomical features in respective ones of the training medical images; and determine variance data for respective ones of the locations of the anatomical features in the reference medical image from a statistical analysis of the determined offsets.

In accordance with certain embodiments the processor unit is further operable to determine variance data for other locations in the reference medical image by interpolation based on the variance data for the locations of the anatomical features in the reference medical image.

In accordance with certain embodiments the processor unit is further operable to determine a registration mapping between a novel medical image and the reference medical image in a manner that takes account of the variance data.

Certain embodiments of the invention provide a computer-implemented method for determining variance data for a plurality of different locations in a reference medical image, the variance data representing a statistical variation among corresponding locations identified in a plurality of training medical images, the computer system comprising: a storage system adapted to store data representing the reference medical image and the plurality of training medical images; receiving an indication of locations of a plurality of anatomical features in the reference medical image and an indication of locations of corresponding anatomical features in respective ones of the training medical images; determining offsets between respective ones of the locations of the anatomical features in the reference medical image and locations for the corresponding anatomical features in respective ones of the training medical images; and determining variance data for respective ones of the locations of the anatomical features in the reference medical image from a statistical analysis of the determined offsets.

Certain embodiments of the invention provide a non-transitory computer program product bearing machine readable instructions and/or an apparatus loaded with and operable to execute machine readable instructions for carrying out a method in accordance with certain embodiments of the invention.

Embodiments of the present invention will be described hereinafter and in the context of a computer-implemented system, method and computer program product which may be stored on a non-transitory medium. Although some of the present embodiments are described in terms of a computer program product that causes a computer, for example a personal computer or other form of workstation, to provide the functionality associated with some embodiments of the invention, it will be appreciated from the following description that this relates to only one example of some embodiments of the present invention. For example, in some embodiments of the invention, a network of computers, rather than a stand-alone computer, may implement the embodiments of the invention. Alternatively, or in addition, at least some of the functionality of the invention may be implemented by means of special purpose hardware, for example in the form of special purpose integrated circuits (e.g., Application Specific Integrated Circuits (ASICs)).

Figure 2:
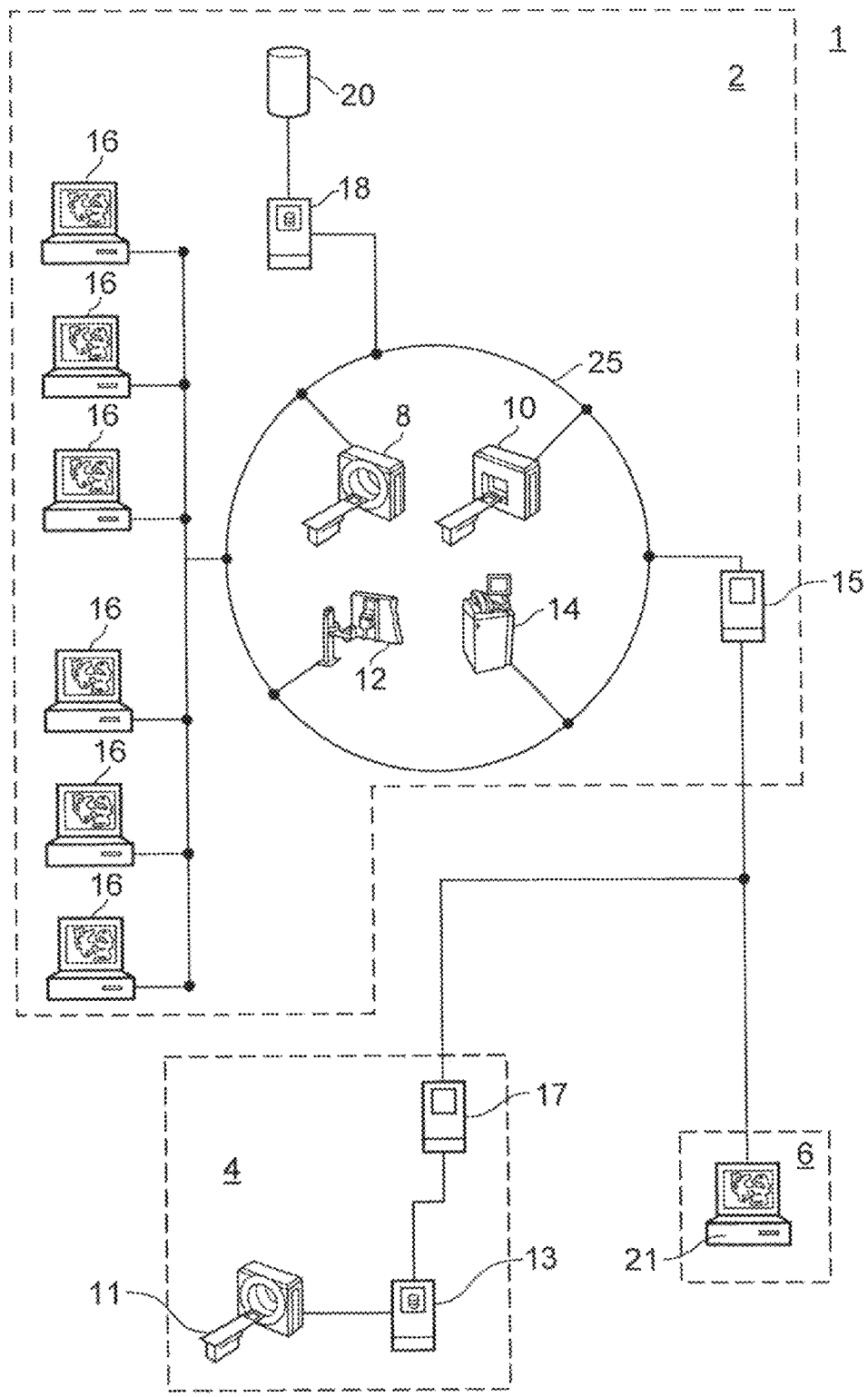
FIG. 2 is a schematic diagram showing an exemplary network of diagnostic devices and associated equipment.

FIG. 2 is a schematic representation of an exemplary network 1 of computer controlled diagnostic devices, stand-alone computer workstations and associated equipment. The network 1 comprises three components. There is a main hospital component 2, a remote diagnostic device component 4 and a remote single user component 6. The main hospital component 2 comprises a plurality of diagnostic devices for acquiring patient images, in this example, a CT scanner 8, a MR imager 10, a digital radiography (DR) device 12 and a computed radiography (CR) device 14, a plurality of computer workstations 16, a common format file server 18, a file archive 20 and an internet gateway 15. All of these features are inter-connected by a local area network (LAN) 25.

The remote diagnostic device component 4 comprises a CT scanner 11, a common format file server 13 and an internet gateway 17. The CT scanner 11 and file server 13 are commonly connected to the internet gateway 17, which in turn is connected via the internet to the internet gateway 15 within the main hospital component 2.

The remote single user component 6 comprises a computer workstation 21 with an internal modem (not shown). The computer workstation 21 is also connected via the internet to the internet gateway 15 within the main hospital component 2.

The network 1 is configured to transmit medical image data as desired by users. For example, the CT scanner 8 initially generates a source dataset, i.e. a 3D image dataset, and this may be converted to a standard image data format and transferred over the LAN 25 to the file server 18 for storage on the file archive 20. A user working on one of the computer workstations 16 may subsequently request the image dataset, the file server 18 will retrieve it from the archive 20 and pass it to the user via the LAN 25. Similarly, a user working remotely from the main hospital component 2, either within the remote diagnostic device component 4, or the remote single user component 6, may also access and transmit data stored on the archive 20, or elsewhere on the network 1.

Figure 3:
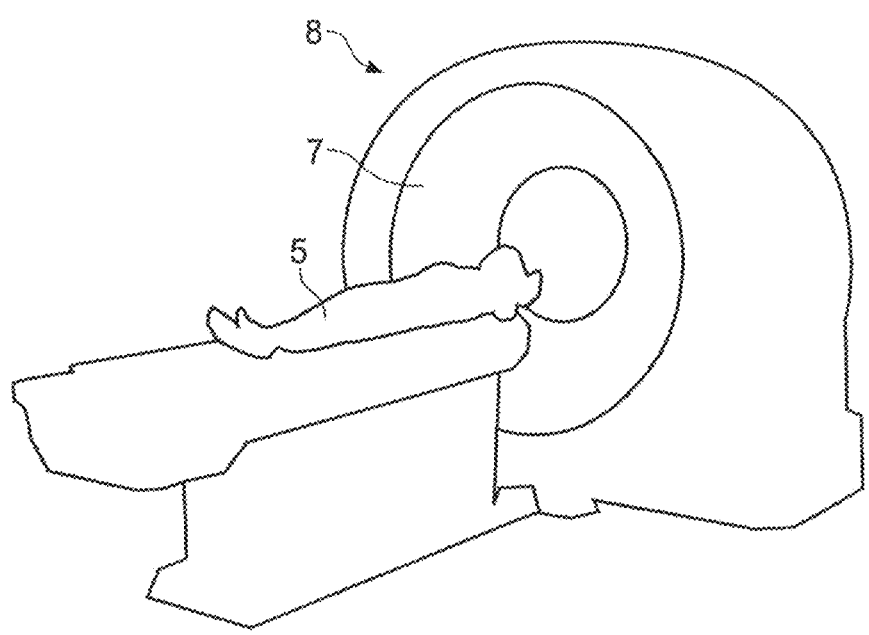
FIG. 3 shows a generic CT scanner for generating volume data.

FIG. 3 is a schematic perspective view of a generic scanner, most especially a computer-assisted tomography (CT) scanner 8 such as represented in FIG. 2, for obtaining a 3D X-ray scan of a region of a patient 5. A patient's abdomen including one or more organs or other anatomical features or body part of interest is placed within a circular opening 7 of the scanner 8. A series of image slices through the patient's abdomen is taken. Raw image data are derived from the scanner and could comprise a collection of one thousand 2D 512×512 data subsets, for example. These data subsets, each representing a slice of the region of the patient being studied, are combined to produce volume data. The volume data, which makes up a 3D image dataset, comprise a collection of voxels each of which corresponds to a pixel in one of the slices. Thus the volume data are a 3D representation of the feature imaged and various user-selected 2D projections (output images) of the 3D representation can be displayed (typically on a computer monitor).

Different imaging modalities (e.g. CT, MR, PET, ultrasound) typically provide different image resolutions (i.e. voxel size), and the overall size of the volume imaged will further depend on the nature of the study. By way of concrete example, a limited volume dataset may comprise an array of 512×512×320 16-bit voxels arranged on a regular Cartesian grid defined by x-, y- and z-axes, with the voxels being spaced by 0.5 mm along each axis (in some cases the voxels may not be equally spaced on each axis). This corresponds to an overall imaged volume of around 25 cm×25 cm×16 cm, which is often adequate to encompass an organ of interest, such as the heart, a kidney, the liver, the bowel, the spleen or the pancreas. Other volume datasets may be larger, for example encompassing a significant fraction of a patient, for example, a so-called "whole-body" image. Larger volume datasets may be built from a number of separate smaller volume datasets, or may be obtained in one acquisition. As is conventional, the volume data are typically aligned with transverse, sagittal and coronal planes. The xy-axes are in a transverse plane, the xz-axes are in a coronal plane and the yz-axes are in a sagittal plane.

Figure 4:
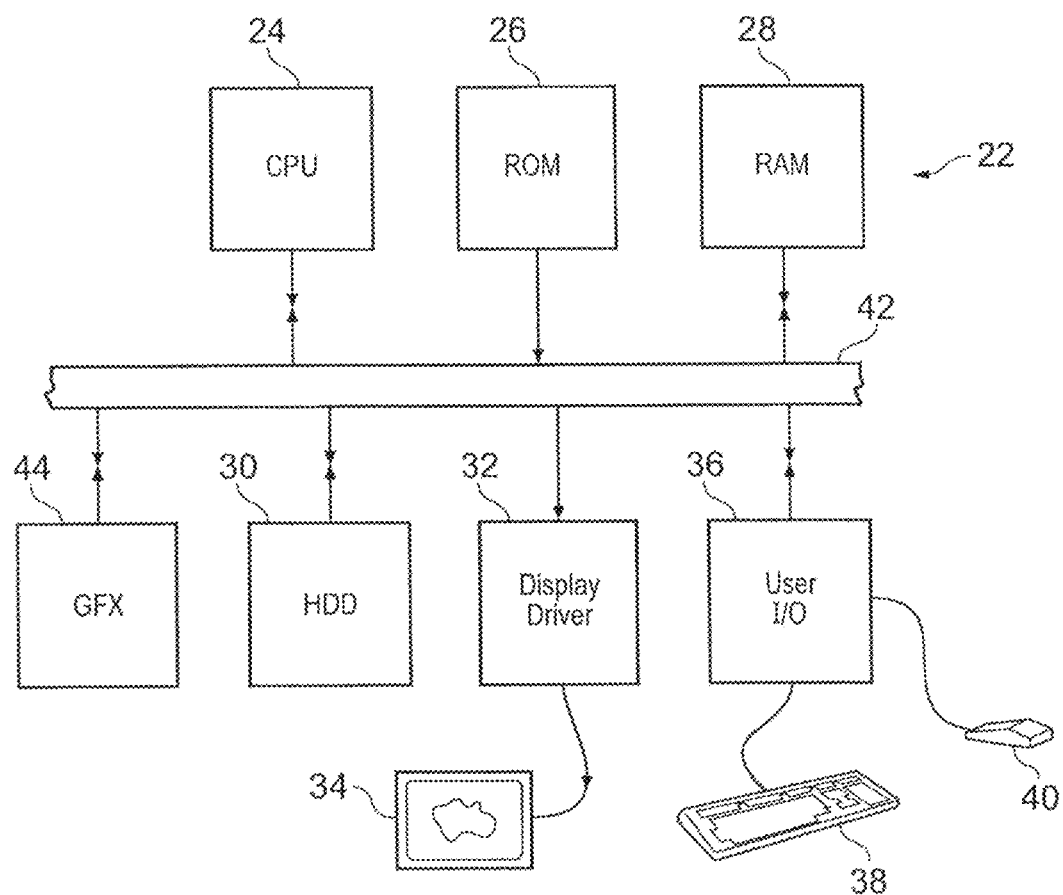
FIG. 4 schematically shows a computer for processing image data.

FIG. 4 schematically illustrates a general purpose computer system 22 configured to perform processing of medical image data in accordance with an embodiment of the invention. The computer 22 includes a central processing unit (CPU) 24, a read only memory (ROM) 26, a random access memory (RAM) 28, a hard disk drive 30, a display driver 32 and display 34 and a user input/output (IO) circuit 36 with a keyboard 38 and mouse 40. These devices are connected via a common bus 42. The computer 22 also includes a graphics card 44 connected via the common bus 42. The graphics card includes a graphics processing unit (GPU) and random access memory tightly coupled to the GPU (GPU memory).

The CPU 24 may execute program instructions stored within the ROM 26, the RAM 28 or the hard disk drive 30 to carry out processing of medical image data that may be stored within the RAM 28 or the hard disk drive 30. The RAM 28 and hard disk drive 30 are collectively referred to as the system memory. The GPU may also execute program instructions to carry out processing image data passed to it from the CPU.

Figure 5:
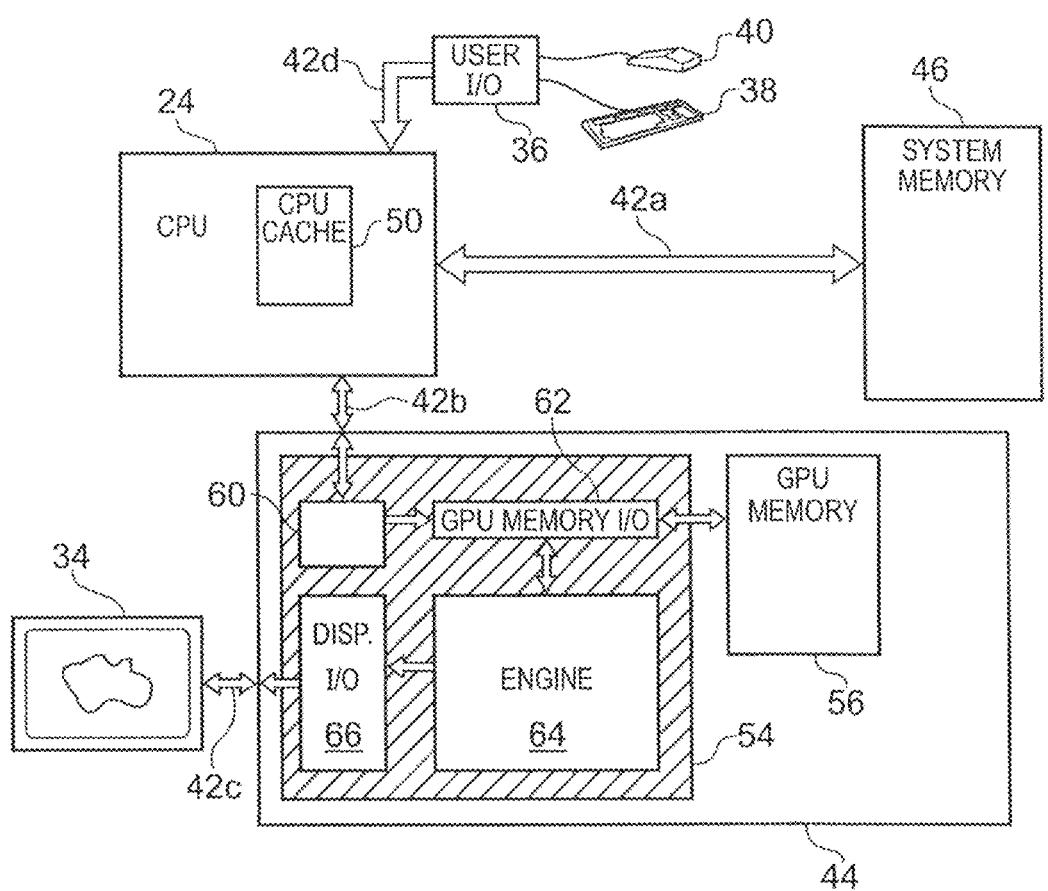
FIG. 5 schematically shows some features of the computer of FIG. 4 in more detail.

FIG. 5 schematically shows some of the features of the computer system shown in FIG. 4 in more detail. The RAM 28 and hard disk drive 30 are shown collectively as a system memory 46. Medical image data obtained from the scanner 8 shown in FIG. 3 is stored in the system memory as shown schematically in the figure. To assist in showing the different data transfer routes between features of the computer system 22, the common bus 42 shown in FIG. 4 is schematically shown in FIG. 5 as a series of separate bus connections 42a-d. A first bus connection 42a connects between the system memory 46 and the CPU 24. A second bus connection 42b connects between the CPU 24 and the graphics card 44. A third bus connection 42c connects between the graphics card 44 and the display 34. A fourth bus connection 42d connects between the user I/O 36 and the CPU 24. The CPU includes a CPU cache 50. The graphics card 44 includes a GPU 54 and a GPU memory 56. The GPU 54 includes circuitry for providing an accelerated graphics processing interface 60, a GPU cache I/O controller 62, a processing engine 64 and a display I/O controller 66. The processing engine 64 is designed for optimized execution of the types of program instructions typically associated with processing medical image datasets.

A user is able to select desired processing parameters using the keyboard 38 and mouse 40 in combination with a graphical user interface (GUI) displayed on the display 34, for example using a movable screen icon in combination with a mouse, track pad etc. to point and click, a touch screen or other known techniques.

Methods described herein can be used within a hospital environment. In this case, the methods may usefully be integrated into a stand-alone software application, or with a Picture Archiving and Communication System (PACS). A PACS is a hospital-based computerized network which can store volume data representing diagnostic images of different types in a digital format organized in a single central archive. For example, images may be stored in the DICOM format. The archive is connected to a computer network provided with a number of workstations, so that users all around the hospital site can access and process patient data as needed. Additionally, users remote from the site may be permitted to access the archive over the Internet.

A user such as a radiologist, a consultant, or a researcher can access a medical image dataset from the workstation, and generate display images, such as a still image of a 2D or 3D dataset or moving images from a 4D dataset.

In accordance with some embodiments of the invention, a computer implementation employing computer program code for storage on a data carrier or in memory can be used to control the operation of the CPU and GPU of the computer system. The computer program can be supplied on a suitable carrier medium, for example a storage medium such as solid state memory, magnetic, optical or magneto-optical disk or tape based media. Alternatively, it can be supplied on a transmission medium, for example a medium with a carrier such as a telephone, radio or optical channel.

As noted above, the process of registering a novel image dataset (study dataset) to a reference image dataset (atlas dataset) is a common task in the field of medical image processing. Certain embodiments of the invention provide for modifications to otherwise conventional image registering techniques as described further below. One particular example will be described in the context of a modified non-rigid registration process based on the established Crum, Hill and Hawkes algorithm (Crum W. R., Hill D. L. G., Hawkes D. J., 2003, "Information theoretic similarity measures in non-rigid registration", IPMI-2003, pp. 378-387). However, it will be readily appreciated the concepts described herein can also be applied in the context of other registration processes.

In broad summary, in accordance with certain embodiments of the invention a method for performing non-rigid registration of a novel medical image to a reference medical image (atlas) is provided, wherein the method takes account of statistical variations seen among a variety of other medical images (training data) for features of the reference medical image.

Figure 6:
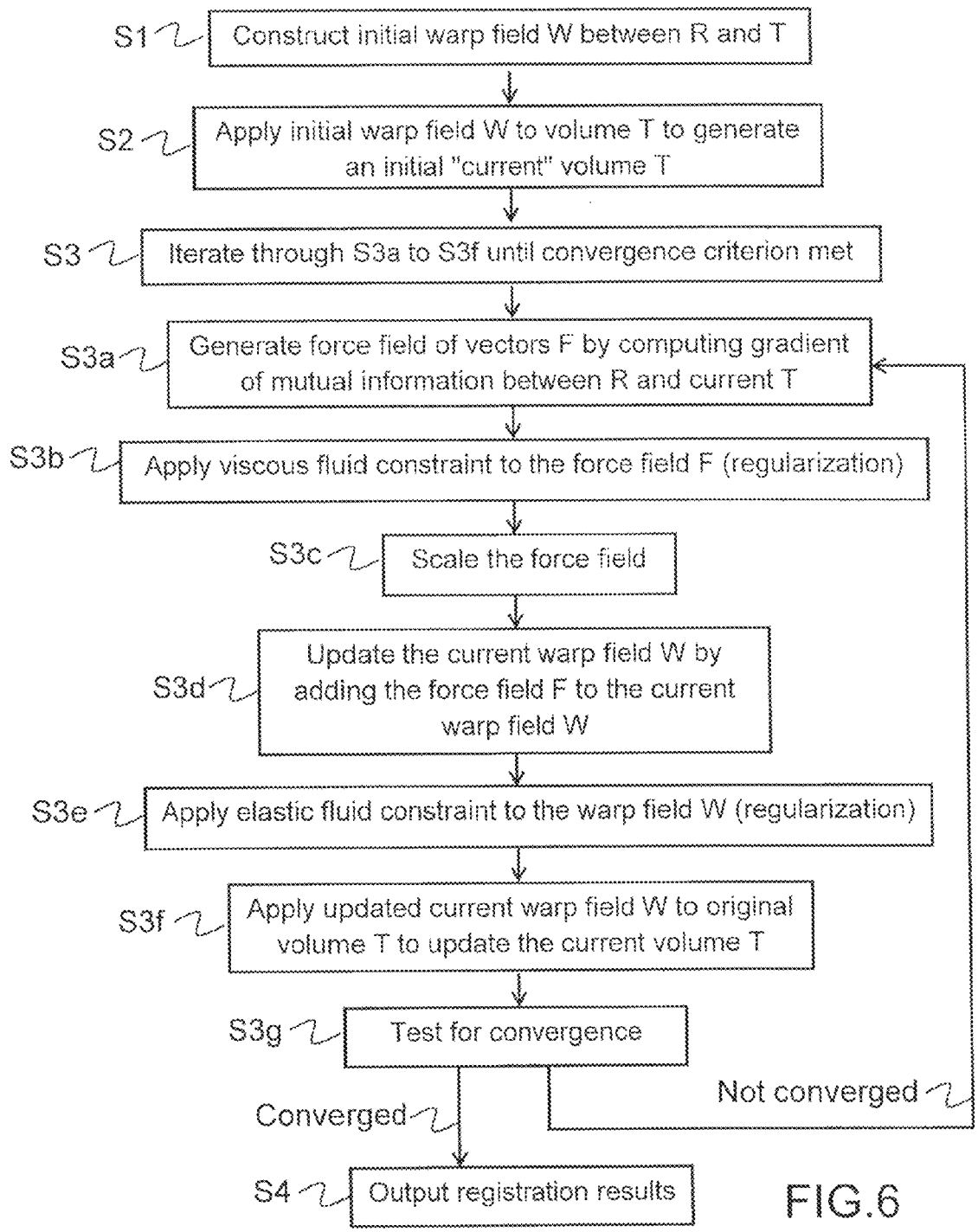
FIG. 6 is a flow chart schematically showing a method of registering an image in accordance with certain embodiments of the invention.

FIG. 6 is a flow chart schematically showing a method of registering an image in accordance with certain embodiments of the invention. The registration process is based generally on the Crum, Hill and Hawkes algorithm mentioned above and is applied to register a novel medical image volume dataset, T, to a reference medical image dataset, R. This algorithm computes a mapping, referred to as a warp field, which indicates a displacement from each voxel of R to a corresponding voxel of T. The method may be summarized as comprising the following main steps:

Step S1—Construct an initial warp field W between the volumes R and T (commonly an identity warp field but may comprise a rigid alignment)

Step S2—Apply this initial warp field W to volume T to give an initial "current" volume T (the process is based on iteratively updating volume T and warp field W, and the updated volume T/warp field W for each iteration may be referred to as the "current" volume T/warp field W for the iteration).

Step S3—Iterate through the following steps until a convergence criterion is met:
  Step S3a—using volume R and the current volume T, compute a gradient of mutual information at each pixel/voxel location in R to provide a force field of vectors F
  Step S3b—apply a viscous fluid constraint to the force field F (this has the effect of restricting the extent to which nearby elements of the volume T can be moved independently of one another during the registration process)
  Step S3c—scale the force field F to govern the displacement per iteration
  Step S3d—update the current warp field W (i.e. generate new current warp field W) by adding the force field F to the current warp field W
  Step S3e—apply an elastic fluid constraint to the current warp field W (this has the effect of restricting the extent to which elements of the volume T can move when the warp field is applied)
  Step S3f—apply the updated current warp field W to the original volume T to update the current volume T
  Step S3g—test for convergence and go to Step S4 if a convergence criterion is met (or if a pre-defined maximum number of iterations have already been performed) and otherwise return to Step S3a. The test for convergence may, for example, be such that if the degree of mutual information between the current volume T and the reference volume R has not changed significantly from the previous iteration, the process may be considered to have converged Step S4—Output registration results In accordance with certain embodiments of the invention the steps S3b and/or S3e in the generalized image registration process described above are performed in a manner which differs from existing techniques and the other steps are performed generally in accordance with existing techniques. In this regard aspects of the steps represented in FIG. 6 which are not described herein in detail may be performed in accordance with the principles of conventional image registration techniques, such as the Crum, Hill and Hawkes algorithm mentioned above.

The steps S3b and S3e of the generalized image registration process described above and represented in FIG. 6 constrain the extent to which the volume T may be distorted/deformed during the non-rigid registration process. This aspect of image registration is typically referred to as regularization and is used to seek to prevent tearing and other discontinuities in the warp field W that is to be applied to the image data.

In accordance with conventional techniques, the regularization of an image registration processes is performed uniformly across the volume data to be registered. However, the Inventor has developed an alternative approach to image registration in which different regularization constraints may be applied at different locations. In particular, in accordance with certain embodiments of the invention, regularization constraints may be relaxed (weaker) for locations in an image that correspond with anatomical features for which there is considered to be a higher degree of variation in spatial arrangement among patients as compared to locations corresponding to anatomical features for which there is considered to be a smaller degree of variation among patients. The degree of variation among patients for different anatomical locations may, for example, be established from a statistical analysis of image data from a sample population.

Figure 7:
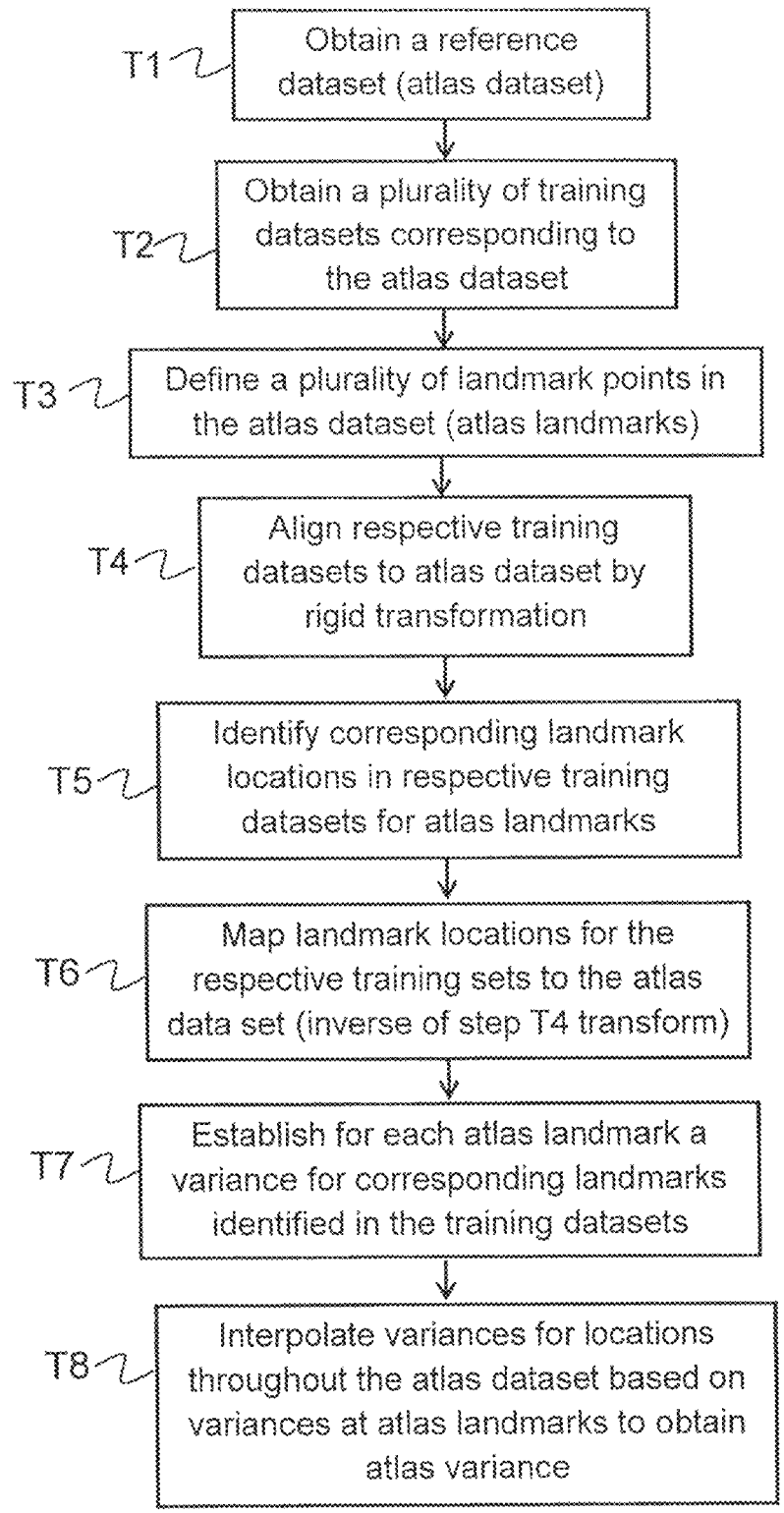
FIG. 7 is a flow chart schematically showing a method of obtaining variance data for a reference image (e.g. atlas) dataset in accordance with certain embodiments of the invention.

FIG. 7 is a flow chart schematically showing a method of obtaining variance data for a reference image (e.g. atlas) dataset in accordance with certain embodiments of the invention.

In step T1 a reference dataset (atlas dataset) is obtained. It will be appreciated that references to obtaining a dataset as used herein are not intended to mean only the process of collecting initial/original medical image data from a patient using a medical imaging device (although in some cases it may do). Rather, the phrase "obtaining a dataset", and corresponding terminology, should be interpreted broadly to also cover, for example, reading a pre-existing dataset from computer storage.

In accordance with certain embodiments of the invention, the atlas dataset is a single atlas considered most appropriate for the application at hand. This may be chosen in accordance with generally conventional techniques for determining an appropriate single atlas dataset to be used for image registration. For example, the atlas dataset may correspond with actual medical image data from what is considered to be a typical patient, or may be generated by combining medical image data from a number of different patients to provide a kind of average patient dataset. The extent of the dataset, for example in terms of how much and what portions of anatomy are covered, will typically depend on the specific application at hand. In principle the atlas may be a whole-body atlas, but in most cases the atlas may cover only a portion of a patient's anatomy. For example, a heart region, a liver and/or kidney region, a brain region, or any other organ or body region of interest for the study at hand.

In step T2 a plurality of datasets corresponding to the anatomical region represented in the atlas dataset is obtained for a number of other patients. These may be referred to as training datasets. For optimum performance the patients from which the training datasets are collected should cover the range of variations in anatomy that might be expected to be seen for the population of interest (i.e. the population from which novel medical image data are to be analyzed through comparison with the atlas dataset). For example, in a study restricted to male patients, it may be considered most appropriate for the atlas dataset and the training datasets to also come from male patients (at least for anatomical features which have systematic differences between male and female patients). For a study restricted to female patients of a certain age range, the atlas dataset and the training datasets may come from female patients within that age range, and so forth.

In step T3 a plurality of landmark points is identified in the atlas dataset. These atlas landmarks may correspond with identifiable anatomical features which are manually identified by a clinician reviewing the atlas dataset.

In step T4 the respective training datasets are aligned to the atlas dataset through rigid transformation. Conventional rigid transformation techniques may be used for this step. In particular, the rigid registration process applied in this step may correspond with whichever rigid registration method is to be used when subsequently initializing comparisons of a novel dataset to the atlas dataset.

In step T5 the locations of anatomical features corresponding to the atlas landmarks are identified in the respective training datasets. Again, this may be performed manually by a clinician reviewing the training datasets.

In step T6 the landmark locations in the training datasets are mapped to the atlas dataset taking account of the rigid registration process applied in step T4. (In principle step T5 may be performed for the training datasets after they have already been rigidly registered to the atlas dataset in step T4 so that step T6 is not performed).

Thus, the result of the processing of FIG. 7 up to this stage is, for each atlas landmark, a plurality of locations in the space of the atlas dataset corresponding to where the corresponding landmarks appears in respective ones of the training datasets. In some cases the atlas landmarks may correspond to individual voxels, whereas in other cases the atlas landmarks may correspond with anatomical features extending over multiple voxels. Where a landmark spans multiple voxels, a spatial centroid for the landmark may be used to represent its location.

In step T7, for each atlas landmark, a measure of the variance among the corresponding locations for the landmarks as seen in the training datasets (in the space of the atlas dataset) is established. This may be referred to as a location variance. In accordance with certain embodiments this may be done for each atlas landmark by determining the respective offsets between the atlas landmark and the corresponding landmark identified in the training datasets. The location variance for the atlas landmark can then be determined from the range of offsets, for example based on the mean-square magnitude of the offsets for the landmark in the respective training datasets.

In step T8 values for location variance for all locations in the atlas dataset (i.e. for all voxels) are interpolated from the location variance values established for the specific atlas landmark locations. In accordance with certain examples, this may be done by using thin-plate splines to construct a volume which interpolates smoothly between the location variances for the atlas landmark locations across the complete atlas dataset volume.

The values for location variance may be referred to as variance data for the atlas dataset. The variance data may take the form of a volume dataset comprising an array of voxels corresponding to those of the atlas dataset with the signal value at each voxel of the variance dataset derived from the variance for that location established in accordance with the method described above with reference to FIG. 7. The variance data may thus be stored in accordance with a standard medical image data format, for example a DICOM format.

Once the variance data for an atlas dataset is established, for example in a method corresponding to that represented in FIG. 7, it may be stored for later use as described further below. In this regard the variance data for a given atlas dataset might only be established once. However, in other examples the variance data may be later re-computed, for example to take into account an increased number of training datasets, or to establish variance data for a subset of training datasets more closely matched to the characteristics of a patient for a particular novel dataset.

Figure 8:
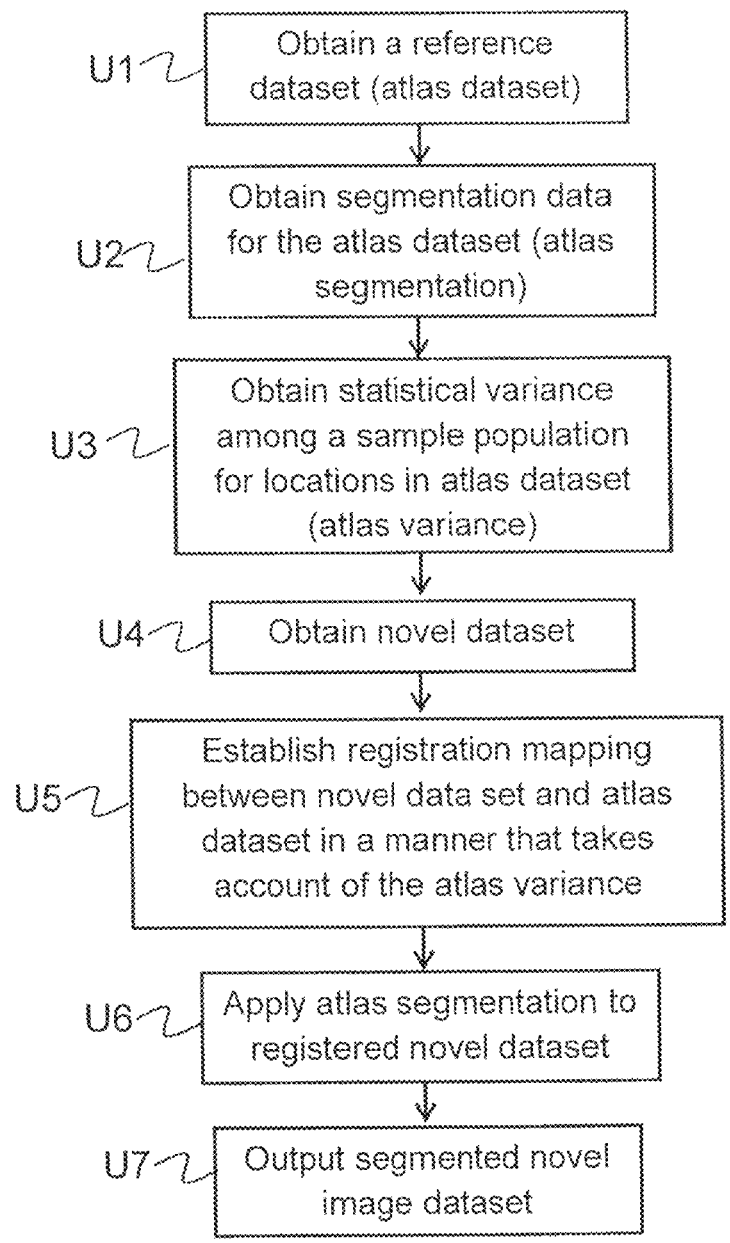
FIG. 8 is a flow chart schematically showing a method of segmenting medical image data in accordance with certain embodiments of the invention.

FIG. 8 is a schematic flow diagram representing a method of segmenting a novel image dataset using image registration that takes account of variance data in accordance with certain embodiments of the invention.

In step U1 a reference dataset (atlas dataset) is obtained (e.g. read from computer storage). The atlas dataset may be selected as being appropriate for segmenting the novel image dataset of interest in accordance with conventional techniques for computer-automated segmentation, for example of the kind represented in FIG. 1.

In step U2 relevant segmentation data for the atlas dataset (atlas segmentation) for the study at hand is obtained (e.g. read from computer storage). The atlas segmentation data may be established in accordance with conventional techniques for computer-automated segmentation, for example based on expert manual identification of anatomical features of interest in the atlas dataset.

In Step U3 variance data (atlas variance) for the atlas dataset is obtained (e.g. read from computer storage). The variance data for the atlas dataset may have been previously obtained in accordance with the method of FIG. 7, for example.

In step U4 the novel dataset is obtained (e.g. read from computer storage).

In step U5 A registration mapping between the novel dataset and the atlas dataset is established in a manner which takes account of the atlas variance data.

In accordance with certain embodiments of the invention, step U5 may follow the registration approach schematically represented in FIG. 6 in which aspects of the regularization (e.g. step S3b and/or step S3e) take account of the variance data. This may be done so that the regularization is not applied uniformly across the volume dataset, but is applied differently for different locations in the atlas data according to the corresponding variance data. In particular, for locations in the atlas dataset where the variance data indicates a relatively high degree of variability among the sample population corresponding with the training datasets, more relaxed regularization constraints may be applied (i.e. allowing greater deformation) than for locations where the variance data indicates a relatively low degree of variability among the training datasets.

There are various ways in which the strength of regularization may be varied with location. For example, one established technique for applying the regularization constraints of steps S3b and S3e represented in FIG. 6 is through Gaussian smoothing. In particular, Gaussian smoothing of the force field F may be used to apply the viscous fluid constraint of step S3b while Gaussian smoothing of the warp field W may be used to apply the elastic fluid constraint of step S3e. Thus, in accordance with certain embodiments of the invention, a kernel for a Gaussian kernel smoothing process applied to the force field F (viscous constraint regularization) and/or the warp field W (elastic constraint regularization) may be determined for each voxel location in the atlas dataset in dependence on the corresponding variance data for the voxel location.

An optimized functional relationship between the kernel of a Gaussian kernel smoothing process and variance data may, for example, be established for a given implementation through an empirical assessment of performance for a number of test datasets. One potential approach would be to maintain a constant kernel size for regularization corresponding to a viscous fluid constraint (step S3b in the FIG. 6 example) and to vary the kernel size for regularization corresponding to an elastic fluid constraint (step S3e in the FIG. 6 example) such that the kernel size is smaller where there is higher variance indicating a greater degree of inter-patient variability. For example, the kernel size used to apply regularization corresponding to an elastic constraint may be determined for each voxel in the atlas dataset in inverse proportion to the square root of the variance.

It will be appreciated that in other examples the regularization constraints associated with a non-rigid registration process may be applied differently other than through Gaussian smoothing of the kind described above. Nonetheless, however the regularization constraint is applied in a given implementation, the strength/degree of regularization may equally be applied in a manner that varies with location in a dataset in dependence on corresponding variance data of the kind described above.

Rather than vary the degree of regularization based on the magnitude of the variance data, in accordance with certain embodiments the degree of regularization, e.g. kernel size for a Gaussian kernel smoothing approach, it may instead be varied based on local gradients in the variance data. This may again be applied only to an elastic regularization constraint or may be applied to an elastic regularization constraint and/or a viscous fluid regularization constraint. An approach based on variance gradient magnitude seen in the variance volume (as opposed to variance magnitude) may be appropriate where it is considered that high variance regions in different patients are still locally consistent. An approach based on variance data gradients will tend to allow for more movement in the warp field between regions associated with high and low location variance.

Thus in a general sense the step U5 of FIG. 8 in accordance with certain embodiments of the invention comprises applying different strengths of regularization for different regions of a dataset in dependence on variance data presenting a degree of inter-patient variability for those regions. The dependency may be based on a relationship between the amount of regularization and the variance data (stronger regularization where variance is low) or based on a relationship between the amount of regularization and gradients in the variance data (stronger regularization where gradient magnitude of variance is low). It may in some cases be appropriate for the relationship to be continuous, for example based on an inverse square root relationship, such as discussed above. Other forms of relationship can be used, for example based on a logistic function (or other sigmoid function). A logistic function may be used to in effect provide for two distinct strengths of regularization with a relatively narrow smooth transition between them. This may be most appropriate when the regularization strength is based on gradient magnitudes in variance data.

Having performed image registration in accordance with an embodiment of the invention in step U5 of FIG. 8, processing proceeds to step U6.

In step U6 the atlas segmentation is applied to the novel dataset after it has been registered to the atlas dataset (i.e. mapped to atlas dataset space). In step U7 the segmented novel image dataset is output, for example for storage for later analysis, or directly to a volume data visualization application to allow a user to view the segmented data. Steps U6 and U7 may be performed in accordance with conventional techniques.

It will be appreciated the approach of FIG. 8 may be modified in accordance with certain other embodiments of the invention. For example, as noted above, the specific application of the regularization constraints of the registration mapping may be different for different implementations. Nonetheless, in any event, and regardless of the specific implementation algorithm, the general concept of using different regularization constraints at different locations in a dataset in dependence on previously-determined degrees of inter-patient variability may be applied.

Furthermore, various steps of FIG. 8 may be performed in a different manner. For example, rather apply the atlas segmentation to the novel image dataset after it has been transformed to the atlas dataset space through the registration mapping of step U5, the segmentation may be applied to the novel image dataset in its own space (i.e. without being mapped to the atlas dataset), and instead the atlas segmentation may be transformed to the novel image dataset space (i.e. using the inverse of the registration mapping established in step U5).

Figure 9:
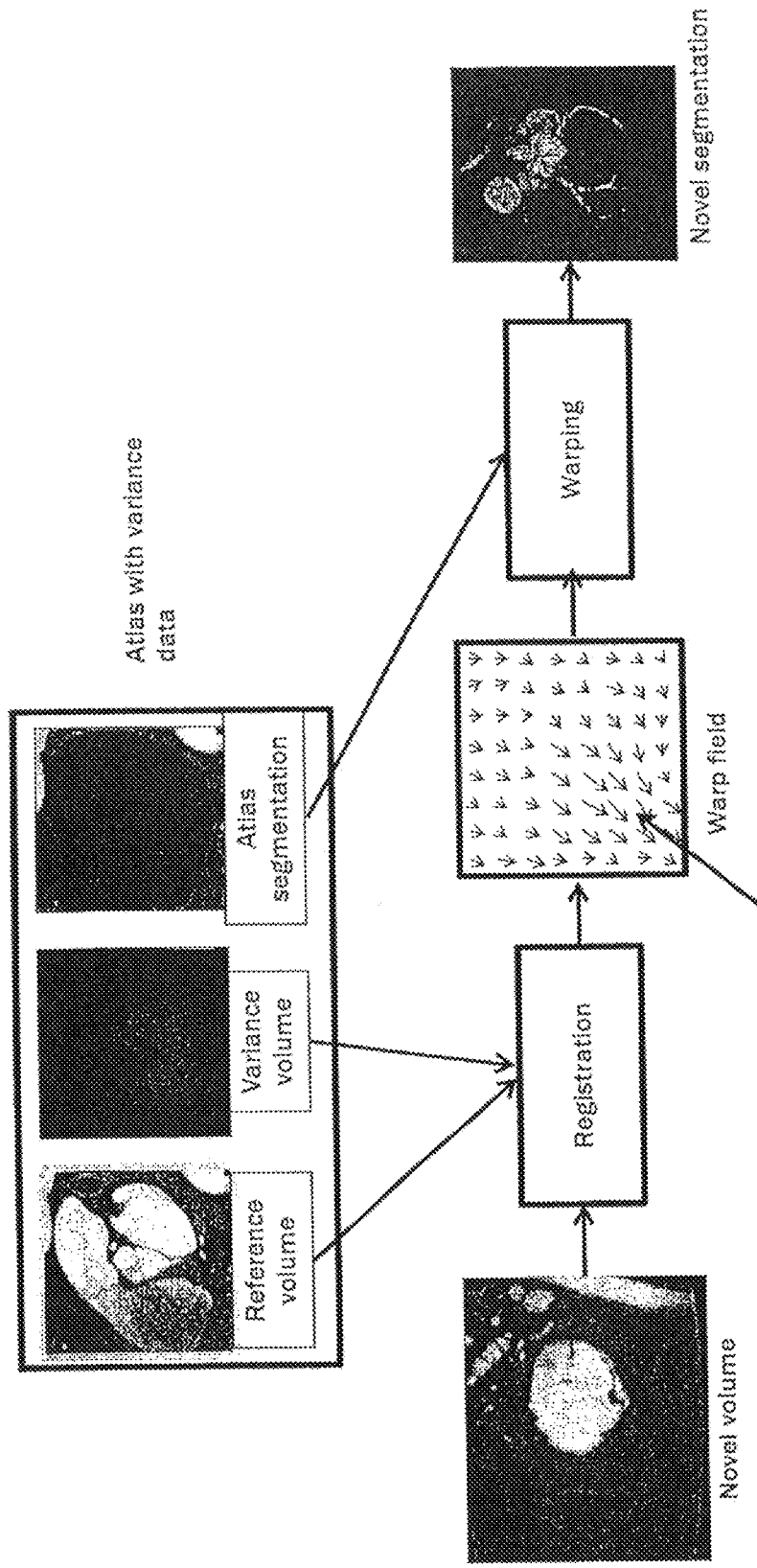
FIG. 9 schematically represents a method of segmenting medical image data in accordance with certain embodiments of the invention.

FIG. 9 is a diagram schematically representing a segmentation process in accordance with certain embodiments of the invention which is in some respects similar to that represented in FIG. 8. Represented towards the top of FIG. 9 are the atlas dataset (reference volume), atlas variance (variance volume) and atlas segmentation corresponding with those referred to in steps U1, U2 and U3 of FIG. 8. To the left of the lower part of FIG. 9 is represented a novel dataset such as that obtained in step U4 of FIG. 8. As schematically indicated in the remainder of FIG. 9, the step of registration (e.g. corresponding to step U5 in FIG. 8) is applied to the novel volume and takes account of both the reference volume and the variance volume. The result of the registration mapping is a mapping transform that is represented in FIG. 9 as a warp field. Significantly, in accordance with certain embodiments of the invention, and in accordance with the principles discussed above, the magnitude of the warp in the warp field representing the registration mapping may be larger where the atlas variance is higher (because these regions are subject to weaker regularization). In the example of FIG. 9, the warp field is used to transform the atlas segmentation from the space of the reference volume dataset to the space of the novel image dataset. The transformed atlas segmentation is applied to the novel volume to provide the segmented novel image dataset (novel segmentation), as schematically represented to the right of the lower part of FIG. 9.

Figure 10:
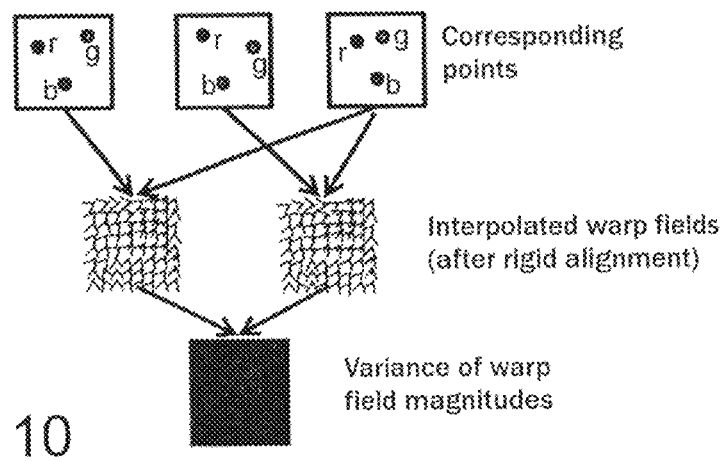
FIGS. 10 and 11 schematically represent methods of obtaining variance data for a reference image in accordance with certain embodiments of the invention.
Figure 11:
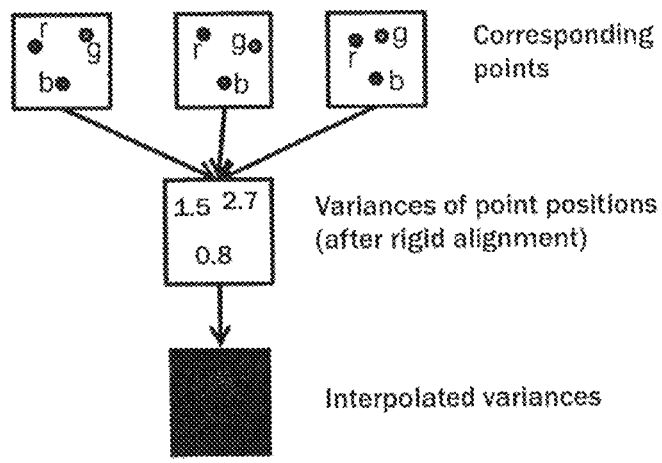

FIGS. 10 and 11 schematically represent two approaches for establishing variance data in accordance with certain embodiments of the invention.

FIG. 10 schematically represents a process which is similar to that represented in FIG. 7. However, the approach of FIG. 10 differs from that represented in FIG. 7 in the stage at which the interpolation is applied. As noted above, the interpolation of step T8 in FIG. 7 is used to determine variance data throughout the atlas dataset based on the variance data established at the atlas landmarks. In the approach of FIG. 7 it is variance data that is interpolated. However, in the approach of FIG. 10, it is the offsets in each training dataset that are interpolated to provide offset values at each location in each training dataset from the offset values derived for the landmark locations. The offsets in each volume may then be combined to provide the variance data in a manner similar to that described above with reference to step T7 in FIG. 7 (except here it is performed for voxels rather than just for the landmark locations).

Thus, the top row of FIG. 10 schematically represents two training dataset (left-hand side and center) and a reference atlas (right-hand side). Locations corresponding to three atlas landmarks (schematically labeled r, g, b) are manually identified by a clinician in each dataset. Each training dataset is compared with the atlas dataset (after rigid alignment) to establish an offset for each landmark location and offsets for other locations (voxels) in the volume data are established, e.g. by thin-plate spline interpolation. These offsets may be considered to represent a warp field presenting a transform from the reference dataset to the respective training dataset (schematically represented in the middle row of FIG. 10). These warp fields may then be combined together to generate variance data. For example, the value of the variance data at each voxel may correspond with the mean square magnitude of the warp fields associated with the respective training dataset for that location.

FIG. 11 schematically represents a process which is similar to that represented in FIG. 7 (i.e. with the interpolation applied to the variance data rather than the offsets).

Thus, the top row of FIG. 11 schematically represents three training dataset (step T2 of FIG. 7). Locations corresponding to three atlas landmarks (schematically labeled r, g, b) are manually identified by a clinician in each dataset (step T5 in FIG. 7). Each training dataset is compared with the atlas dataset (after rigid alignment—step T4 in FIG. 7) to establish an offset for each landmark location and a variance measure for the offsets established for each atlas landmark is determined (step T7 in FIG. 7) as schematically represented in the middle row of FIG. 11. Values for variance data at other locations in the atlas dataset (e.g. voxel is away from the atlas landmarks) can be determined by interpolation of the variance data values determined for the landmark locations (step T8 in FIG. 7), a schematic represented in the bottom row of FIG. 11.

It will be appreciated the above description has focused only on some embodiments, and there are many variations which may be made.

For example, whereas the above description has in some respects focused on the process of registering a novel/study medical image dataset with a reference medical image dataset (atlas) for the purposes of automated segmentation, in accordance with other examples the registering may be performed for other reasons, for example to assist in landmark placement.

Embodiments of the invention may include incorporating the methods and associated computer programs described herein as a component in an imaging application, for example in a volume rendering application.

A computer program product bearing machine readable instructions for carrying out the method is disclosed.

A computer loaded with and operable to execute machine readable instructions for carrying out the method is disclosed.

A computer program product is disclosed. Examples of a computer program product bearing machine readable instructions for carrying out the method described above are the mass storage device HDD 30 of FIG. 4, the ROM 26 of FIG. 4, the RAM 28 of FIG. 4 and the system memory 46 of FIG. 5, and the servers 13, 18 of FIG. 2. Other forms of computer program product include a spinning disk based storage device such as a CD or DVD, or a USB flash memory device.

Examples of a computer loaded with and operable to execute machine readable instructions for carrying out the method described above are the computer of FIG. 4, the computer of FIG. 5, and individual elements, e.g. terminals or collective multiple elements of the computer network system shown in FIG. 2, e.g. one of the servers 13, 18 in combination with one or more of the terminals or computers provided with the medical imaging devices.

Examples of a computer program product bearing machine readable instructions for carrying out the method described above are the mass storage device HDD 30 of FIG. 4, the ROM 26 of FIG. 4, the RAM 28 of FIG. 4 and the system memory 46 of FIG. 5, and the servers 13, 18 of FIG. 2. Other forms of computer program product include a spinning disk based storage device such as a CD or DVD, or a USB flash memory device.

While the method has been primarily described with reference to CT medical image datasets collected by conventional CT scanners, the principles described herein are more generally applicable to other 2D and 3D datasets, and also so-called 4D datasets, i.e. time sequences of volume image datasets. For example, the method may be applied to other imaging types used in the medical field, referred to as modalities. In particular, the methods described herein may be applied to MR images and PET images as well as to images of merged datasets from two modalities such as CT and PET.

While certain embodiments have been described, these embodiments have been presented by way of example only, and are not intended to limit the scope of the inventions. It will be appreciated that features and aspects of the invention described above in relation to certain embodiments of the invention are equally applicable and may be combined with other features and aspects of other embodiments of the invention as appropriate. The novel methods, computers and computer program products and devices described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A computer system operable to determine a registration mapping between a novel medical image and a reference medical image, the computer system comprising:
   a memory adapted to store data representing the novel medical image and the reference medical image and variance data for a plurality of different locations in the reference medical image representing a statistical variation for corresponding locations identified in a plurality of training medical images; and
   processing circuitry operable to execute machine readable instructions to:
   determine a registration mapping between the novel medical image and the reference medical image in a manner that takes account of the variance data for the plurality of different locations in the reference medical image; and
   subject the registration mapping to a regularization constraint determined from the variance data for the plurality of different locations in the reference medical image.

2. The computer system of claim 1, wherein the regularization constraint is applied to restrict an amount of distortion associated with the registration mapping for the plurality of different locations in the reference medical image.

3. The computer system of claim 1, wherein the regularization constraint is applied to restrict differences in the amount of distortion associated with the registration mapping for the plurality of different locations in the reference medical image.

4. The computer system of claim 1, wherein the regularization constraint comprises an elastic fluid constraint.

5. The computer system of claim 1, wherein the regularization constraint comprises a viscous fluid constraint.

6. The computer system of claim 1, wherein the variance data comprises a volume dataset and the plurality of different locations for the variance data in the reference medical image correspond with voxel locations in the reference medical image.

7. The computer system of claim 1, wherein the reference medical image is based on a combination of the training medical images.

8. The computer system of claim 1, wherein the memory is further adapted to store segmentation information for the reference medical image, and the processing circuitry is further operable to generate segmentation information for the novel medical image based on the segmentation information for the reference medical image by taking account of the determined registration mapping.

9. The computer system of claim 1, wherein the memory is further adapted to store landmark information for the reference medical image, and the processing circuitry is further operable to generate landmark information for the novel medical image based on the landmark information for the reference medical image by taking account of the determined registration mapping.

10. A computer-implemented method for determining a registration mapping between a novel medical image and a reference medical image, the method comprising:
    obtaining a novel medical image, a reference medical image and variance data for a plurality of different locations in the reference medical image representing a statistical variation among corresponding locations identified in a plurality of training medical images; and
    determining a registration mapping between the novel medical image and the reference medical image by taking account of the variance data for the plurality of different locations in the reference medical image;
    wherein the registration mapping is subject to a regularization constraint determined from the variance data for the plurality of different locations in the reference medical image.

* * * * *